United States Patent
Ries et al.

(10) Patent No.: US 8,954,969 B2
(45) Date of Patent: Feb. 10, 2015

(54) FILE SYSTEM OBJECT NODE MANAGEMENT

(75) Inventors: Joan Marie Ries, Oronoco, MN (US); Richard Michael Theis, Sauk Rapids, MN (US)

(73) Assignee: International Business Machines Corporation, Armonk, NY (US)

(*) Notice: Subject to any disclaimer, the term of this patent is extended or adjusted under 35 U.S.C. 154(b) by 1718 days.

(21) Appl. No.: 12/142,418

(22) Filed: Jun. 19, 2008

(65) Prior Publication Data

US 2009/0320022 A1    Dec. 24, 2009

(51) Int. Cl.
G06F 12/08    (2006.01)
G06F 9/50    (2006.01)

(52) U.S. Cl.
CPC .................... *G06F 9/5033* (2013.01)
USPC ........................................... 718/102

(58) Field of Classification Search
CPC .............. G06F 9/5033; G06F 9/4856
USPC ........................................ 718/102
See application file for complete search history.

(56) References Cited

U.S. PATENT DOCUMENTS

| | | | | |
|---|---|---|---|---|
| 6,049,853 | A | * | 4/2000 | Kingsbury et al. ........... 711/147 |
| 6,985,984 | B2 | * | 1/2006 | Radovic et al. .............. 710/200 |
| 2006/0150189 | A1 | * | 7/2006 | Lindsley ....................... 718/105 |
| 2008/0244226 | A1 | * | 10/2008 | Li et al. .......................... 712/30 |

OTHER PUBLICATIONS

Joan Marie Ries, et al., U.S. Patent Application entitled "File System Object Node Management," filed Jun. 19, 2008.

* cited by examiner

*Primary Examiner* — Robert Fennema
(74) *Attorney, Agent, or Firm* — Patterson & Sheridan, LLP

(57) ABSTRACT

Embodiments of the invention provide a method for assigning a home node to a file system object and using information associated with file system objects to improve locality of reference during thread execution. Doing so may improve application performance on a computer system configured using a non-uniform memory access (NUMA) architecture. Thus, embodiments of the invention allow a computer system to create a nodal affinity between a given file system object and a given processing node.

24 Claims, 5 Drawing Sheets

FILE SYSTEM OBJECT NODE MANAGEMENT

BACKGROUND OF THE INVENTION

1. Field of the Invention

Embodiments of the invention generally relate to managing access to shared resources on a computer system. More specifically, embodiments of the invention relate to techniques for managing thread access to objects in a file system on a multi-node computer system.

2. Description of the Related Art

Computer systems typically include a memory for storing programs and one or more processors which execute programs stored in the memory. Typically, an operating system may be configured to schedule and execute multiple threads as separate units of execution. In a multithreaded computing environment, each thread may access resources, including files stored in a file system.

NUMA (short for non-uniform memory access) refers to a computing architecture for a cluster of processors. Computer systems configured using NUMA architectures include multiple processing nodes, where each node includes one or more processors and local memory resources. Typically, NUMA systems are configured as "tightly-coupled," "share everything" systems where the nodes are managed by a single operating system and may access each others memory over a common bus. That is, a processor in one node may access memory in another. Nevertheless, in such architectures, it is faster for a processor to reference the memory local to that node. Thus, poor nodal affinity for data in memory results in poor performance, i.e., when a thread executing on one node frequently accesses data in memory on another node, system performance suffers.

A general solution to this problem is to assign each thread to a home node (i.e., create a nodal "affinity" for each thread). Nodal affinity causes the system to allocate the thread's memory pages from the home node, if possible. A thread dispatcher, in turn, preferentially dispatches the thread for execution on its assigned home node. This increases the probability that memory references for the thread will be local (i.e., within the home node).

SUMMARY OF THE INVENTION

One embodiment of the invention includes a method for dispatching a thread to one of a plurality of processing nodes of a computer system. The method may generally include detecting that a first thread executing on a first one of the plurality of processing nodes is about to access a file system object of a file system, determining that the first thread is interrupted while accessing the file, and identifying a current home node attribute assigned to the file system object. The current home node attribute may be identify one of the processing nodes. When the first thread is subsequently dispatched for execution, the first thread may be dispatched to the identified processing node for execution.

Another embodiment of the invention includes a computer-readable storage medium containing a program which, when executed, performs an operation for dispatching a thread to one of a plurality of processing nodes of a computer system. The operation may generally include detecting that a first thread executing on a first one of the plurality of processing nodes is about to access a file system object of a file system, determining that the first thread is interrupted while accessing the file, and identifying a current home node attribute assigned to the file system object. The current home node attribute may identify one of the processing nodes. When the first thread is subsequently dispatched for execution, the first thread may be dispatched to the identified processing node for execution.

Still another embodiment of the invention includes a system having a plurality of processing nodes, each having a respective processor and a memory. The processing nodes are communicatively coupled to a common bus. The system may further include includes an operating system configured to manage a plurality of threads executing on the plurality of processing nodes. The operating system may generally be configured to perform an operation for dispatching a thread to one of a plurality of processing nodes of a computer system. The operation may generally include detecting that a first thread executing on a first one of the plurality of processing nodes is about to access a file system object of a file system, determining that the first thread is interrupted while accessing the file, and identifying a current home node attribute assigned to the file system object. The current home node attribute may identify one of the processing nodes. When the first thread is subsequently dispatched for execution, the first thread may be dispatched to the identified processing node for execution.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
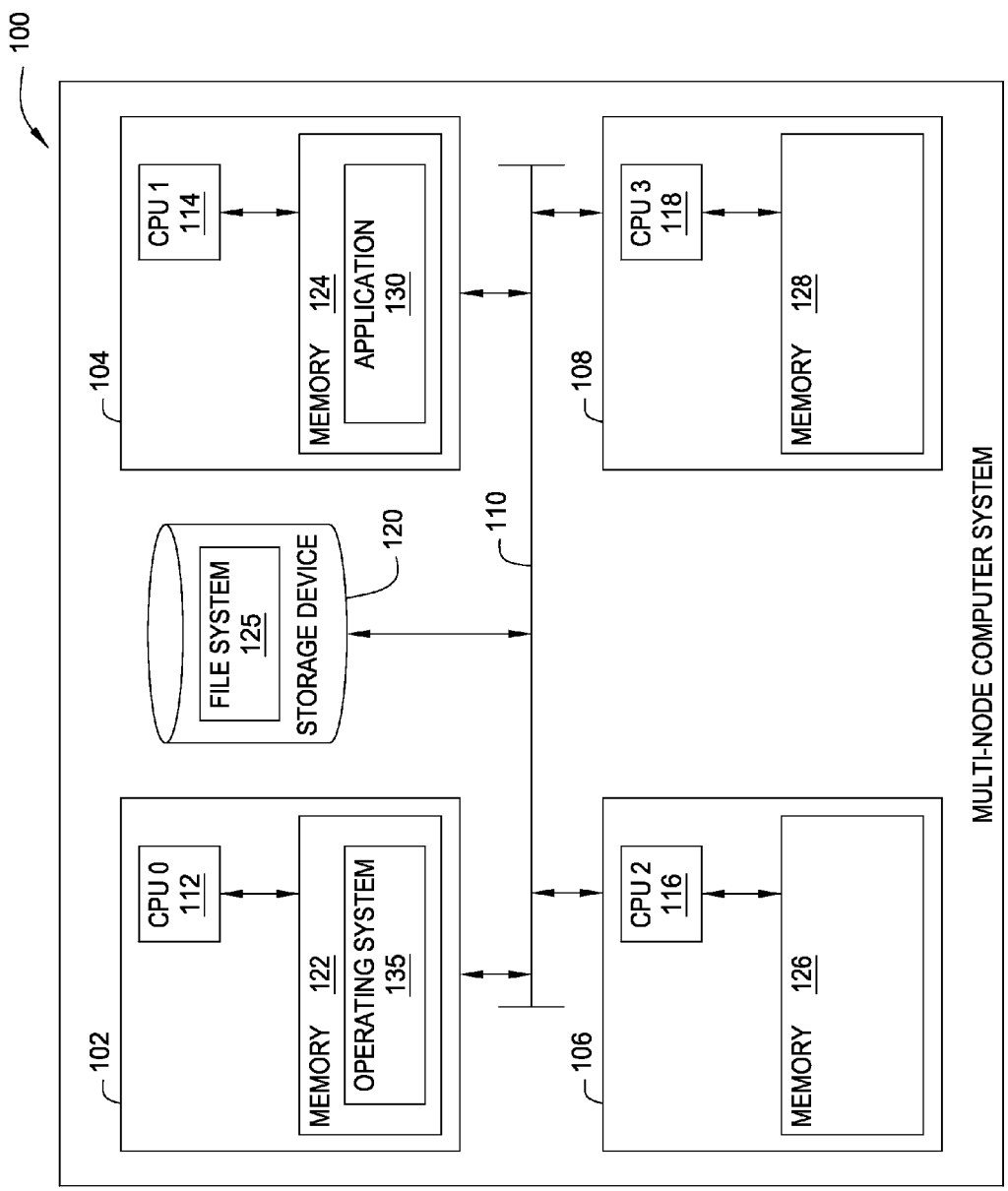
FIG. 1 is a block diagram illustrating a computer system configured using a NUMA architecture, according to one embodiment of the invention.

Embodiments of the invention provide a method for assigning a home node to a file system object and using information associated with file system objects to improve locality of reference during thread execution. Doing so may improve application performance on a computer system configured using a NUMA architecture. In one embodiment, each file system object may be assigned a home node. That is, embodiments of the invention allow a computer system to create a nodal affinity between a given file system object and a given processing node.

In NUMA-based systems, a thread may be assigned a preferred home node and preferentially allocate memory resources from the local memory of the home node. While this approach frequently works well for threads that create objects stored in the memory of the home node, it is not always ideal when the thread accesses file system objects, since they often have a system-wide scope and may be accessed regularly by multiple threads which could themselves have different home nodes. For example, if a first thread frequently accesses a given file, and a second thread accesses the file only occasionally, then assigning the file to the home node of the first thread provides superior execution performance versus assigning the file to the home node of the second thread.

Thus, determining the appropriate nodal affinity for file system objects can result in improved performance for applications that perform a significant amount of file system activity. Accordingly, in one embodiment, when a thread accesses a file system object, a current home node may be assigned to that object. The particular node may be selected based on a variety of factors associated with the file system object (e.g., a preferred home node attribute, historical usage patterns, access type details, etc.), as well as take into account a home node of the thread requesting access to the file system object. For example, if a given thread has an assigned nodal affinity for a particular node, the current home node of the file system object may be set to the same node. Further, during thread execution, a thread control block may note when file system object data is about to be accessed. If the thread gets re-dispatched to another node during the access (e.g., if the thread ends up waiting on a mutex lock or an I/O request), then the home node selected for the thread may be based on the home node of the thread and the home node of the file system object. By re-dispatching the thread to the same processing node associated with the file, locality of reference, and thus system performance, may be improved.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram illustrating a computer system 100 configured using a NUMA architecture, according to one embodiment of the invention. As shown, the computer system 100 includes four processing nodes 102, 104, 106 and 108, and each node includes a local memory space and a processor. Specifically, processing node 102 includes a CPU 112 and a memory 122, processing node 104 includes a CPU 114 and a memory 124, processing node 106 includes a CPU 116 and a memory 126, and processing node 108 includes a CPU 118 and a memory 128. CPUs 112, 114, 116 and 118 each represent one or more programmable logic devices that, collectively, execute the instructions, logic, and mathematical processing on computer system 100. For example, CPU 112 may represent a single CPU, multiple CPUs, a single CPU having multiple processing cores, and the like. Memory 122, 124, 126, 128 may be one or a combination of memory devices, including random access memory, nonvolatile or backup memory, (e.g., programmable or flash memories, read-only memories, etc.).

Also as shown, the processing nodes 102, 104, 106, and 108 are each coupled to system bus 110, and each of the CPUs 112, 114, 116, and 118, may retrieve and store information in the memory 122, 124, 126, and 128 over the system bus 110. Of course, the time required for a processing node to access its own local memory (e.g., processing node 102 to access memory 112) may be substantially faster than the time required to access memory on another one of the processing node (e.g., processing node 102 to access memory 128). Further, each node may include a memory cache (not shown) used to further improve the speed at which the processor may access information.

Storage device 120 stores application programs and data on a file system 125 for use by computer system 100. Storage 120 may be one or more hard-disk drives, flash memory devices, optical media and the like. Additionally, computer system 100 may be connected to a data communications network (e.g., a local area network, which itself may be connected to other networks such as the internet), and may include input/output devices such as a mouse, keyboard and monitor.

Illustratively, the memory 122 of processing node 102 includes an operating system 135 and memory 124 includes an application 130. As is known, operating system 135 may be configured to manage the computer hardware provided by processing nodes 102, 104, 106, and 108 and the execution higher-level software applications running on computer system 100 (e.g., a Linux® distribution, a version of Microsoft Windows®, IBM's AIX® or i5/OS®, and the like) ("Linux" is a registered trademark of Linus Torvalds in the United States and other countries).

For example, as described in greater detail below, application 130 may be a multithreaded application running on computer system 100 in parallel with other applications and operating system 135 may include a thread dispatcher configured to select a thread ready for execution and to dispatch it to one of the processing nodes 102, 104, 106, and 108. Once dispatched, the thread may be scheduled for execution on the dispatched node. Further, operating system 135 may be configured to assign a preferred home node to a given thread, as well as assign a home node to a given file from file system 125. That is, the operating system may select to create nodal affinities between the processing nodes, threads, and files from system objects, as is appropriate in particular case.

Figure 2:
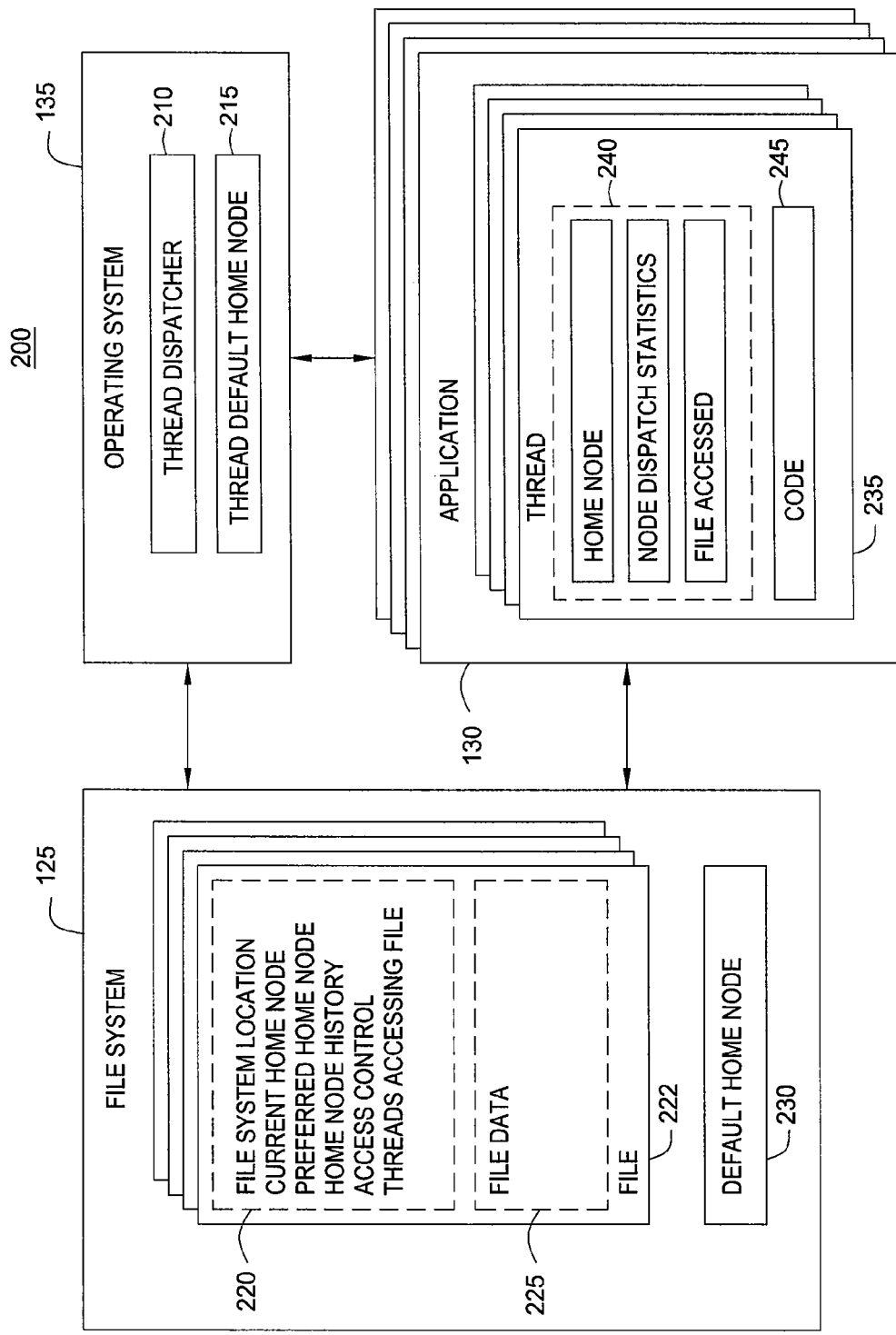
FIG. 2 is a block diagram further illustrating aspects of the computer system of FIG. 1, according to one embodiment of the invention.

FIG. 2 is a block diagram 200 further illustrating aspects of the computer system of FIG. 1, according to one embodiment of the invention. As shown, diagram 200 further illustrates aspects of file system 125, operating system 135, and applications 130.

Illustratively, file system 125 includes a plurality of file system objects 222 as well as metadata 230 indicating a default home node to assign to file system objects 222. Each of the file system objects 222 represents a file which may store data accessed by application programs 130 and operating systems 135. For example, application programs 130 may read portions of a file system object 222 into memory as well as write data to the file. As is known, a file system 122 provides a system for organizing files on a storage device (e.g., a disk hard drive).

As shown, each file system object 222 may include a set of file data 225 as well as file metadata 220 used by the operating system 135 to manage the file system objects 222. In one embodiment, file metadata 220 may include a current home node assigned to the file 222, a preferred home node assigned to the file 222, a history of what processing nodes the file 222 has been assigned, access control information, and an indication of what threads are currently accessing the file 222. Of course, the particular file metadata 220 defined for files 222 of file system 125 may be tailored to suit the needs of a particular case. File data 225 represents the substantive content of a file system object 222.

In one embodiment, file system objects 222 may be assigned a home node determined, at least in part, from metadata 220. For example, a file system object 222 may have a preferred home node attribute which may be manually set much like other file system attributes. When set, the system may increase the relative weight of the preferred home node when determining the home node assigned to a given file system object 222. Similarly, the system may track the most recent home nodes assigned to a file system object 222 in the home node history of file system metadata 220. In such a case, the system may increase the relative weight of the node(s) with the highest usage when determining the actual home node to assign to the file system object 222. If there is no node with a highest usage, (which could occur with commonly used file system objects, e.g., a root directory object), the system may increase the relative weight of the default home node 230. As the name implies, the default home node 230 provides a default node to assign as the home node for file system objects 222.

Further, in one embodiment, access control information may be used to assign a home node to a given file system object in the appropriate case. For example, if a thread requests exclusive or cached access to a file system object 222 (e.g. a request to open a file with no sharing or to set a current working directory, etc.) then the home node of that thread would be the logical choice to assign as the home node of the requested file.

As stated, applications 130 may include multiple threads 235. Each thread 235 provides a unit of program execution that may be executed independently of one another. Each thread may include a code segment 245 and thread metadata 240 used by the operating system 135 to manage the thread 235. In one embodiment, the thread metadata 240 may include a home node assigned to the thread 235, node dispatch statistics for the thread 235, and a list of files accessed by the thread 235. The thread dispatch statistics may indicate which processing nodes the thread 235 has been dispatched while application 130 executes on a computer system.

Also as shown, operating system 135 includes a thread dispatcher 210 and metadata 215. Of course, one of ordinary skill in the art will recognize that operating system 135 is expected to include a variety of additional components used to manage the execution of applications 130 on a given computer system. In this example, metadata 215 is used to indicate a default home node to assign a given thread 235. In one embodiment, the default home node may be static, e.g., if a thread lacks an assigned home node, always assign the thread to a particular processing node, but may also be dynamic, e.g., if a thread lacks an assigned home node, assign the thread to a particular processing node using a round-robin scheduling protocol.

In one embodiment, the thread dispatcher 210 may provide a component of the operating system 135 configured to select a thread 235 ready for execution and to dispatch the selected thread to a processing node where the thread may then be scheduled for execution. For example, in a NUMA based system, the thread dispatcher 210 may dispatch a thread to execute on a processing node which the thread has been assigned a nodal affinity. i.e., a thread home node.

Figure 3:
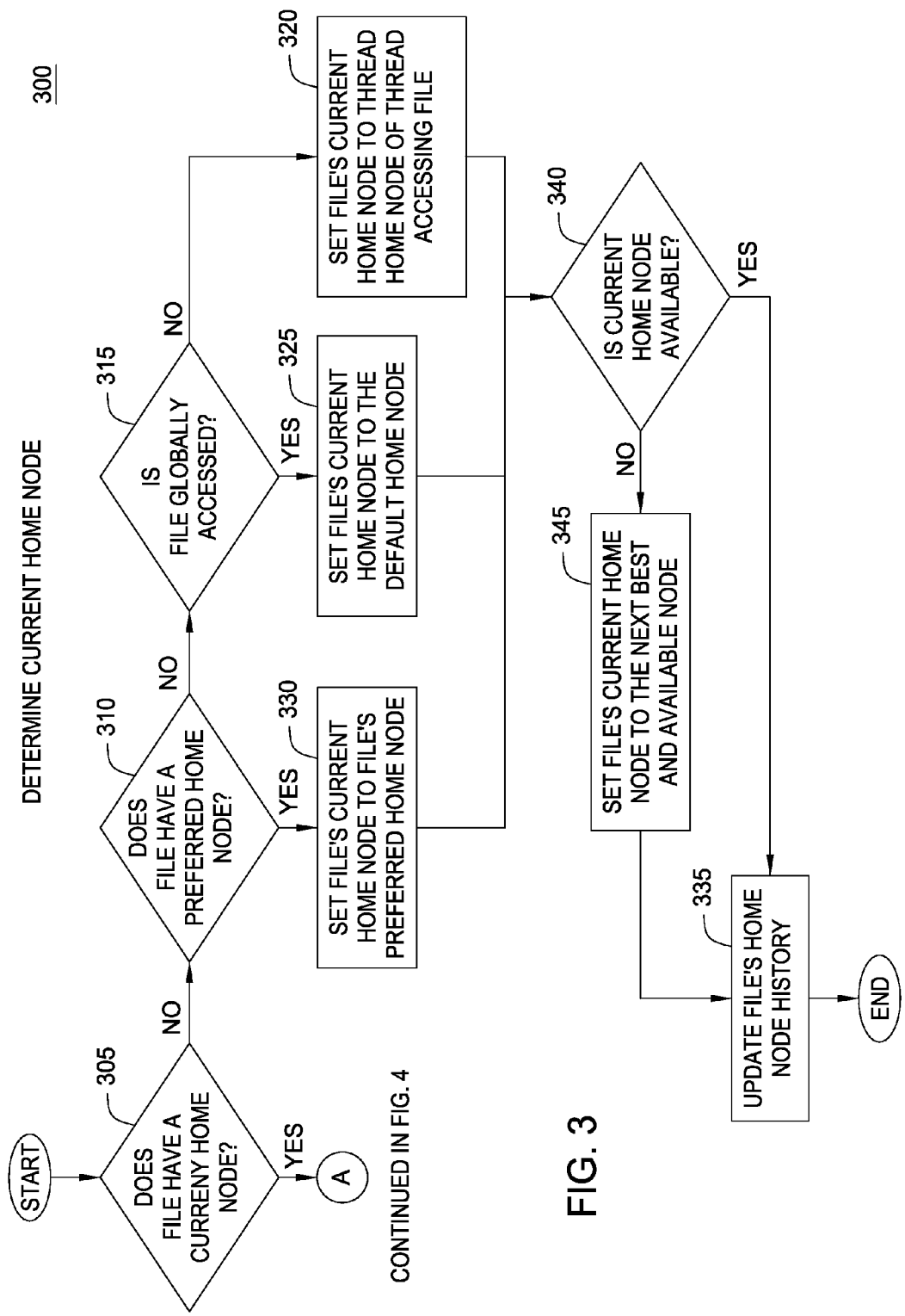
FIG. 3 illustrates a method for assigning a current home node to a file system object on a computer system configured using a NUMA architecture, according to one embodiment of the invention.

FIG. 3 illustrates a method 300 for determining a current home node for a file system object on a computer system configured using a NUMA architecture, according to one embodiment of the invention. As shown, the method 300 begins at step 305 where the storage manager (or other operating system component) determines whether a file system object has a current home node. For example, when a thread requests to open a file and load a portion of the file in memory, the operating system may determine that the file already a current home node. If so, then the method 300 proceeds to steps discussed below in conjunction with FIG. 4.

Otherwise, where the requested file does not have a current home node, the method 300 proceeds to step 310. At step 310, the operating system may determine whether the requested file has a preferred home node. In one embodiment, a file may include a preferred home as an attribute that may be set by users, applications, and/or the operating system. For example, a programmer may develop a computer program with a thread configured to access data in a particular file. In such a case, the programmer may set a preferred home node attribute of such a file to a home node assigned to that thread by the operating system. That is, the program may be configured to set the nodal affinity of the file to mirror the nodal affinity of the thread itself. This result is reflected in step 330 where the operating system sets the current home node of the file to the preferred home node of the file. In such a case, when the file is then accessed (e.g., by a requesting thread), portions of the file may be read into the memory associated with the preferred home node.

If the file does not have a preferred home node, then at step 315, the operating system may determine whether the file is accessed globally, i.e., whether the file is often accessed by other threads or applications running on the computer system such as the case for file system root directories. If so, then at step 325, the operating system may set the current home node of the file to the default home node. The default home node may be set as a parameter of the file system or operating system and provide a node accessible by each node of the computer system. In one embodiment, the default home node may be determined by evaluating a home node assigned to threads accessing the file, i.e., the nodal affinity of the file may be determined from the nodal affinity of threads accessing the file. This approach allows the file to "gravitate" toward the node from which it is most frequently accessed. Otherwise, at step 320, the current home node of the file may be set to the home node of the thread accessing the file. This may occur, for example, when a thread requests exclusive access to a given file, when this is the first access to a given file or when the given file isn't usually accessed globally such as the case for a user's personal files and directories.

After setting the current home node of the requested file (steps 330, 325, and 330), at step 340, the storage manager may determine whether the current home node is available for use by the file system object. For example, because the memory on any given node is finite, depending on the size of the file system object, there may simply not be enough memory available for store the object on the assigned current home node. In such a case, the node may be assigned to the next best and available compute node (step 345).

At step 335, the operating system may update a history of home nodes assigned to the file system object. Once a current home node is assigned, when the file is then accessed (e.g., by a requesting thread), portions of the file may be read into the memory associated with the current home node.

Figure 4:
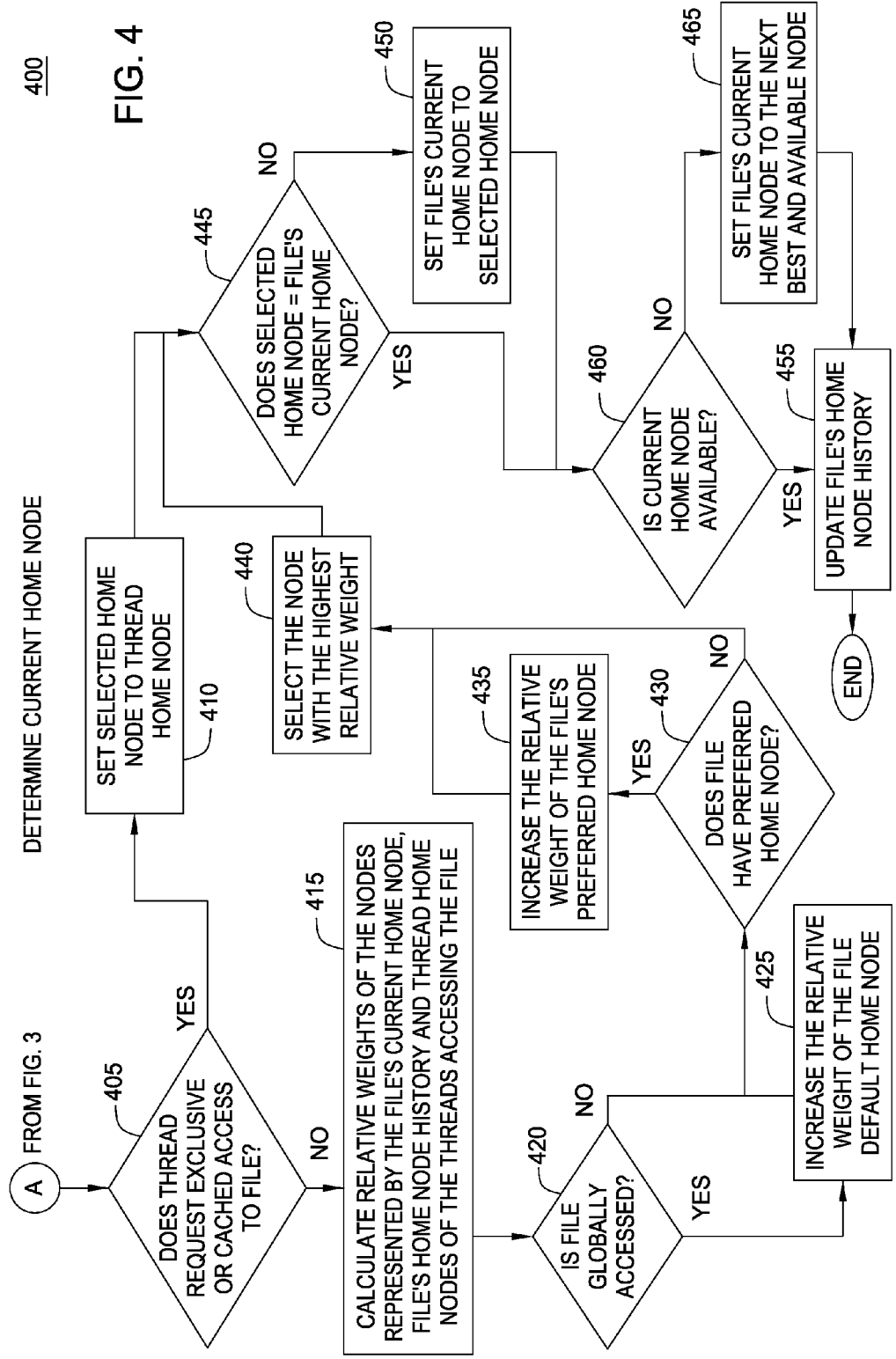
FIG. 4 illustrates a method for evaluating and updating the node assigned as a home node for a for a file system object on a computer system configured using a NUMA architecture, according to one embodiment of the invention.

FIG. 4 illustrates a method 400 for evaluating and updating the node assigned as a home node for a file system object on a computer system configured using a NUMA architecture, according to one embodiment of the invention. Illustratively, method 400 represents a sequence of steps that may be performed following step 305 of FIG. 3 when the operating system determines that a file has a current home node when a thread requests access to that file.

As shown, the method 400 begins at step 405 where the operating system determines whether a thread requesting access to a file has requested exclusive or cached access to the file. If so, at step 410, the operating system may set a selected home node for the file to the home node associated with the requesting thread. The selected home node is then evaluated relative to the current home node of the file to determine whether the current home node of the file should be updated to the selected one. Specifically, in one embodiment, the operating system may determine whether the selected home node and the current home node of the file are the same (step 445). If so, at step 460, the storage manager may determine whether the current home node is available for use by the file system object. For example, because the memory on any given note is finite, depending on the size of the file system object, there may simply not be enough memory available for store the object on the assigned current home node. In such a case, the file's current home node may be set to the next best and available compute node (step 465).

Otherwise, if the operating system determines that selected home node and the current home node of the file are not the same, then at step 450, the current home node of the file is set to the selected home node. That is, the current home node of the file is set to the home node of the thread requesting exclusive access to the file. Once set, the method proceeds to step 460 to determine whether the newly assigned current home node is available to store the file system object, as discussed above. At step 455, the operating system may update the file history of home nodes to reflect the compute node assigned as the current home node of the file at step 465.

Returning to step 405, if the operating system determines that the thread is not requesting exclusive access to the file, then at step 415, the operating system may evaluate nodes of the computing system which may be set as the current home node of the requested file. That is, the operating system may score the available nodes of the computing system relative to one another and set the current home node of the file to the one having the highest score. For example, in one embodiment, the operating system may calculate a relative weight for the current home node of the file, other nodes which had previously been set as current home node of the file, and a relative weight for the home node of the thread requesting access to the file. This approach allows the file to "gravitate" toward the node from which it is most frequently accessed. The relative weights are calculated by assigning a weight factor A, B and C to the Thread Home Nodes, History of Home Nodes and Current Home Node respectively. The weight factors are applied to each node to determine the total weight for a node. For example, if node 1 is the home node of two threads that are accessing the file, node 1 is found in the history of Home Nodes three times and node 1 is the file's current home node, then the relative weight of node 1 is 2*A+3*B+C. The values of A, B and C could be static or could be dynamic and configurable to adjust for different operating system and file system configurations.

At step 420, if the file is accessed globally, i.e., if the file is frequently accessed by threads on multiple nodes, then at step 425, the relative weight of the default home node of the file may be increased. Doing so allows the file to be assigned a current home node different from the node requesting access in cases where overall system performance may be improved. At step 430, if the requested file has a preferred home node, then at step 435 the relative weight of the preferred home node of the file may be increased. Of course, one of skill in the art will recognize that the relative weighs assigned at step 415 may be adjusted to account for a variety of circumstances in addition to the ones reflected in steps 425 an 430.

At step 440, the operating system may select a home node having the highest relative weight. The node selected at step 440 is then evaluated relative to the current home node of the file to determine whether the current home node of the file should be updated to the selected one. Specifically, at step 445, the operating system may determine whether the home node selected at step 440 is the same as the current home node of the file. If so, the method 400 ends, leaving the current home node of the file unchanged. Otherwise, at step 450, the current home node of the file is set to the home node selected at step 440. At step 455, the operating system may update the file history of home nodes to reflect the home node assigned as the current home node at step 450.

In one embodiment, during thread execution, a thread control block may be configured to note when the thread is about to request access to a file system object. In such a case, if the thread gets interrupted prior to completing the file access, (e.g., if the thread ends up waiting on a mutex lock or an I/O request), then the node which the thread is subsequently dispatched to may be based on both the home node of the thread and the home node of the file system object. For example, assume thread X is executing on a currently assigned home node (node 1) and is about to read data from file system object Y and that thread X is interrupted (or preempted) prior to accessing object Y. Assume further that the home node of object Y is node 2. In such a case, then thread X may be re-dispatched on node 2 instead of node 1 during this opportune moment. After thread X has accessed data from file Y (while executing on node 2), thread X could get re-dispatched back to its home node. Additionally, if a thread is frequently dispatched to nodes different from an assigned home node for reasons such as the above example, then the home node assigned to that thread may be adjusted accordingly.

Figure 5:
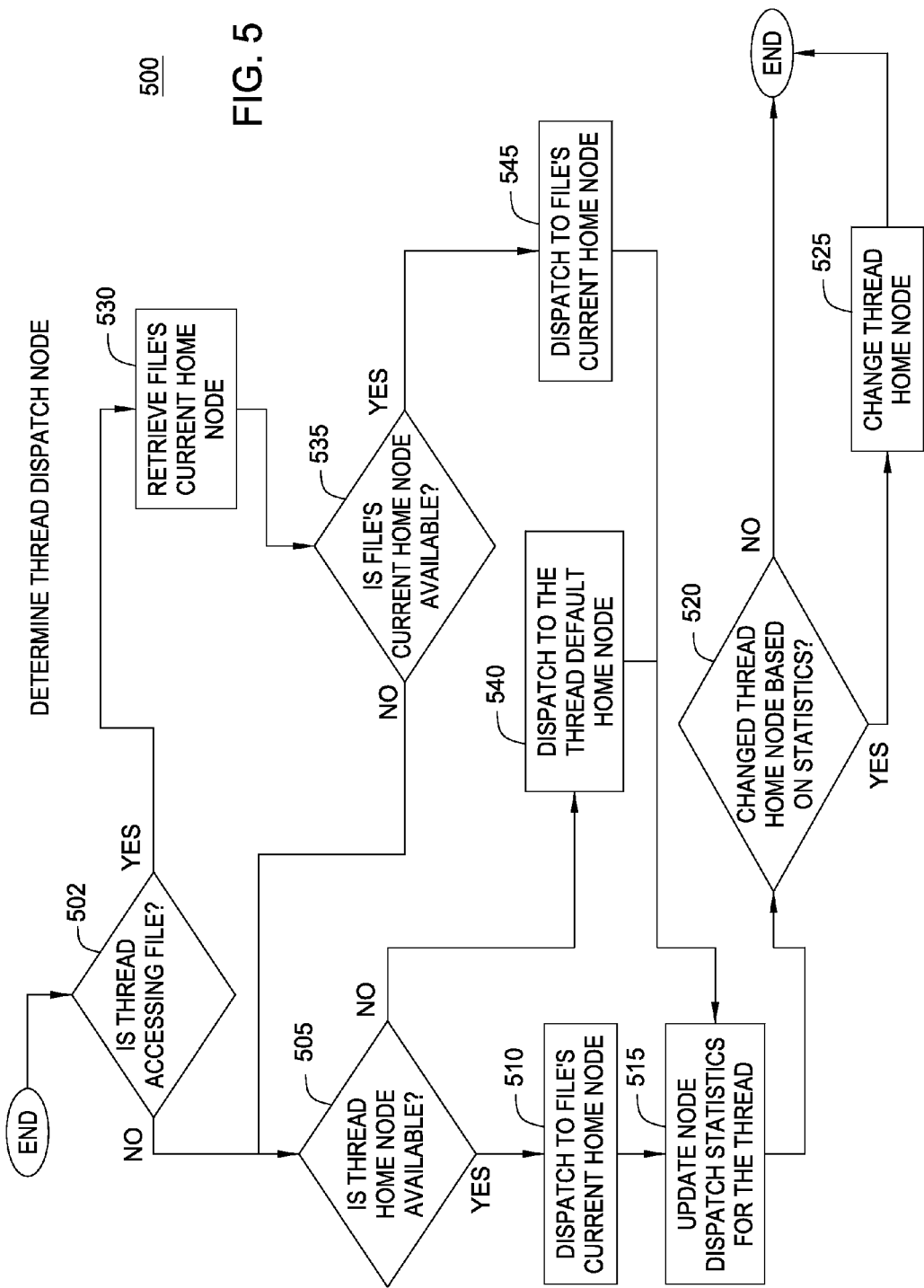
FIG. 5 illustrates a method for adjusting thread execution on a NUMA based computer system, according to one embodiment of the invention.

FIG. 5 illustrates a method 500 for adjusting thread execution on a NUMA based computer system, according to one embodiment of the invention. As shown, the method 500 begins at step 502 where the operating system determines whether a thread is accessing a file. For example, the thread may have been accessing file on one of the compute nodes, at some point been interrupted, and is now being dispatched for further execution. In such a case, method 500 specifies that the operating system should preferentially dispatch the thread to a home node of that thread. Thus, if the thread is not accessing a file system object, and if the thread has a nodal affinity for a given processing node, the operating system first determines whether that node is available to execute the thread (step 505). If so, at step 510, a thread dispatcher (or other operating system component) may dispatch the thread to the home node assigned to the thread. Once dispatched, the thread may be scheduled for execution on the CPU of the processing node to which the thread was dispatched. At step 515, the operating system may update a set of thread dispatch statistics to reflect that the thread was dispatched to the home node of that thread. At step 520 and 525, the operating system may evaluate the thread dispatch statistics to determine whether performance may be improved by changing the home node of the thread.

Otherwise, if the thread dispatcher determines that the home node for the thread is not available (step 505), then the thread dispatcher may dispatch the thread to a default home node (step 540), and update thread dispatch statistics (step 515), as well as evaluate whether to change the home node of the thread just dispatched (steps 520 and 525).

Returning to step 502, if the tread is currently accessing a file, then at step 530, the thread dispatcher may retrieve the current home node of the file being accessed by the thread, and at step 535, the thread dispatcher may determine whether the thread may be dispatched to the current home node of the file. That is, if the file system object has a particular nodal affinity for a given node, the operating system may determine whether the thread may be dispatched to that node. Doing so may improve system performance as it is frequently easier for a thread to get dispatched to a given node than for a file (i.e. data) to get loaded into memory. Thus, if the object is being accessed from a given node, it may be beneficial to dispatch the thread to that node (i.e., to send the thread to the file system object) rather than requiring the thread to load the object on some other node. Nevertheless, if the home node of the file is not currently available for the thread to be dispatched to, then another node may be selected (steps 505, 510).

However, if the current home node of the file is available, then the thread may be dispatched to that node (step 545). Once dispatched, (i.e., after one of steps 540 and 545) the thread may be scheduled for execution on the CPU of the processing node to which the thread was dispatched. At step 515, the operating system may update a set of thread dispatch statistics to reflect what node the thread was dispatched to, and, as described above, the operating system may evaluate the thread dispatch statistics to determine whether performance may be improved by changing the home node of the thread (steps 520-525).

Advantageously, by intelligently assigning a home node to file system objects and using the assigned node during thread execution, embodiments of the invention improve locality of reference for a thread and thus performance for applications and operations that perform a significant number of file system object accesses.

While the foregoing is directed to embodiments of the present invention, other and further embodiments of the invention may be devised without departing from the basic scope thereof, and the scope thereof is determined by the claims that follow.

What is claimed is:

1. A computer-implemented method to select nodes for threads and for shared data in order to improve nodal affinity of a computer system, comprising:
   determining that a first thread executing on a first processing node of a plurality of processing nodes is interrupted while accessing a file system object loaded into a memory of the first processing node;
   identifying a current home node attribute assigned to the file system object, wherein the current home node attribute identifies one of the plurality of processing nodes based on at least one of a preferred home node attribute of the file system object, historical usage data characterizing accesses of the file system object by one or more threads across the plurality of processing nodes, a set of threads across the plurality of processing nodes currently accessing the file system object, and an access type requested by the first thread to access the file system object, wherein a value of the preferred home node attribute is defined as metadata of the file system object;
   when the first thread is subsequently dispatched for execution, dispatching the first thread to the identified processing node for execution to avoid one or more subsequent interruptions of the first thread while accessing the file system object; and
   modifying the value of the preferred home node attribute of the file system object based on at least two of: a set of the most recent home nodes of the file system object, a node identified to access the file system object most frequently relative to other nodes, and a default home node of the file system object.

2. The method of claim 1, further comprising, loading the file system object into a memory associated with the identified processing node.

3. The method of claim 2, wherein the first thread accesses the memory of the identified processing node to access data stored by the file system object.

4. The method of claim 3, further comprising, updating a history of processing nodes to which the first thread is dispatched to reflect being dispatched to the identified processing node.

5. The method of claim 4, further comprising, updating a home node attribute associated with the first thread to reference the identified processing node, wherein the current home node attribute of the file system object is further identified based on at least two of the preferred home node attribute, the historical usage data, the set of threads across the plurality of processing nodes currently accessing the file system object, and the access type requested by the first thread.

6. The method of claim 5, wherein the plurality of processing nodes is configured according to a non-uniform memory access (NUMA) architecture, wherein the current home node attribute of the file system object is further identified based on at least three of the preferred home node attribute, the historical usage data, the set of threads across the plurality of processing nodes currently accessing the file system object, and the access type requested by the first thread.

7. The method of claim 6, wherein the historical usage patterns and the access type details are stored as metadata of the file system object, wherein the current home node attribute of the file system object is further identified based on each of the preferred home node attribute, the historical usage data, the set of threads across the plurality of processing nodes currently accessing the file system object, and the access type requested by the first thread.

8. The method of claim 7, wherein the access type comprises at least one of exclusive access and cached access to the file system object.

9. A computer program product, comprising:
a computer-readable storage medium having computer-readable program code embodied therewith, which, when executed by a machine, performs an operation to select nodes for threads and for shared data in order to improve nodal affinity of a computer system, the computer-readable program code comprising:
computer-readable program code configured to determine that a first thread executing on a first processing node of a plurality of processing nodes is interrupted while accessing a file system object loaded into a memory of the first processing node;
computer-readable program code configured to identify a current home node attribute assigned to the file system object, wherein the current home node attribute identifies one of the plurality of processing nodes based on at least one of a preferred home node attribute of the file system object, historical usage data characterizing accesses of the file system object by one or more threads across the plurality of processing nodes, a set of threads across the plurality of processing nodes currently accessing the file system object, and an access type requested by the first thread to access the file system object, wherein a value of the preferred home node attribute is defined as metadata of the file system object;
computer-readable program code configured to, when the first thread is subsequently dispatched for execution, dispatch the first thread to the identified processing node for execution to avoid one or more subsequent interruptions of the first thread while accessing the file system object, thereby improving nodal affinity; and
computer-readable program code configured to modify the value of the preferred home node attribute of the file system object based on at least two of: a set of the most recent home nodes of the file system object, a node identified to access the file system object most frequently relative to other nodes, and a default home node of the file system object.

10. The computer program product of claim 9, further comprising computer-readable program code configured to load the file system object into a memory associated with the identified processing node.

11. The computer program product of claim 10, wherein the first thread accesses the memory of the identified processing node to access data stored by the file system object.

12. The computer program product of claim 11, further comprising computer-readable program code configured to update a history of processing nodes to which the first thread is dispatched to reflect being dispatched to the identified processing node.

13. The computer program product of claim 12, further comprising:
updating a home node attribute associated with the first thread to reference the identified processing node, wherein the current home node attribute of the file system object is further identified based on at least two of the preferred home node attribute, the historical usage data, the set of threads across the plurality of processing nodes currently accessing the file system object, and the access type requested by the first thread.

14. The computer program product of claim 13, wherein the plurality of processing nodes is configured according to a non-uniform memory access (NUMA) architecture, wherein the current home node attribute is further identified based on at least three of the preferred home node attribute, the historical usage data, the set of threads across the plurality of processing nodes currently accessing the file system object, and the access type requested by the first thread.

15. The computer program product of claim 14, wherein the historical usage patterns and the access type details are stored as metadata of the file system object, wherein the current home node attribute of the file system object is further identified based on each of the preferred home node attribute, the historical usage data, the set of threads across the plurality of processing nodes currently accessing the file system object, and the access type requested by the first thread.

16. The computer program product of claim 13, wherein the access type comprises at least one of exclusive access and cached access to the file system object.

17. A system, comprising:
a plurality of processing nodes, each having a respective processor and a memory, wherein the plurality of processing nodes are communicatively coupled to a common bus; and
an operating system configured to manage a plurality of threads executing on the plurality of processing nodes, wherein the operating system is configured to perform an operation to select nodes for threads and for shared data in order to improve nodal affinity of a computer system, the operation comprising:
determining that a first thread executing on a first processing node of a plurality of processing nodes is interrupted while accessing a file system object loaded into a memory of the first processing node;
identifying a current home node attribute assigned to the file system object, wherein the current home node attribute identifies one of the plurality of processing nodes based on at least one of a preferred home node attribute of the file system object, historical usage data characterizing accesses of the file system object by one or more threads across the plurality of processing nodes, a set of threads across the plurality of processing nodes currently accessing the file system object, and an access type requested by the first thread to access the file system object, wherein a value of the preferred home node attribute is defined as metadata of the file system object;

when the first thread is subsequently dispatched for execution, dispatching the first thread to the identified processing node for execution; and modifying the value of the preferred home node attribute of the file system object based on at least two of: a set of the most recent home nodes of the file system object, a node identified to access the file system object most frequently relative to other nodes, and a default home node of the file system object.

18. The system of claim 17, wherein the operation further comprises, loading the file system object into a memory associated with the identified processing node.

19. The system of claim 18, wherein the first thread accesses the memory of the identified processing node to access data stored by the file system object.

20. The system of claim 19, wherein the operation further comprises, updating a history of processing nodes to which the first thread is dispatched to reflect being dispatched to the identified processing node.

21. The system of claim 20, wherein the operation further comprises, updating a home node attribute associated with the first thread to reference the identified processing node, wherein the current home node attribute of the file system object is further identified based on at least two of the preferred home node attribute the historical usage data, the set of threads across the plurality of processing nodes currently accessing the file system object, and the access type requested by the first thread.

22. The system of claim 21, wherein the plurality of processing nodes is configured according to a non-uniform memory access (NUMA) architecture, wherein the current home node attribute of the file system object is further identified based on at least three of the preferred home node attribute, the historical usage data, the set of threads across the plurality of processing nodes currently accessing the file system object, and the access type requested by the first thread.

23. The system of claim 22, wherein the current home node attribute of the file system object is further identified based on each of the preferred home node attribute, the historical usage data, the set of threads across the plurality of processing nodes currently accessing the file system object, and the access type requested by the first thread.

24. The system of claim 23, wherein the first thread requests access type comprises at least one of exclusive access and cached access to the file system object.

* * * * *